US011866976B2

(12) United States Patent
Davis

(10) Patent No.: US 11,866,976 B2
(45) **Date of Patent: *Jan. 9, 2024**

(54) GATE HINGE PIN ASSEMBLY

(71) Applicant: Bobby G. Davis, Union, KY (US)

(72) Inventor: Bobby G. Davis, Union, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/840,564

(22) Filed: Jun. 14, 2022

(65) Prior Publication Data

US 2022/0381074 A1 Dec. 1, 2022

Related U.S. Application Data

(63) Continuation-in-part of application No. 16/428,720, filed on May 31, 2019, now Pat. No. 11,359,426.

(51) Int. Cl.
*E05D 5/02* (2006.01)
*E05D 5/10* (2006.01)

(52) U.S. Cl.
CPC .......... *E05D 5/10* (2013.01); *E05D 2005/104* (2013.01); *E05D 2005/106* (2013.01); *E05D 2005/108* (2013.01); *E05Y 2201/682* (2013.01); *E05Y 2600/61* (2013.01); *E05Y 2600/622* (2013.01); *E05Y 2600/626* (2013.01); *E05Y 2900/40* (2013.01)

(58) Field of Classification Search
CPC ........ E05D 2005/104; E05D 2005/106; E05D 2005/108; E05D 5/10; E05D 5/121; E05D 5/02; E05D 7/02
See application file for complete search history.

(56) References Cited

U.S. PATENT DOCUMENTS 1,177,094 A * 3/1916 Feltman .................. E06B 11/04 49/160
1,188,302 A * 6/1916 Mohns ...................... E05D 5/02 16/253
1,345,559 A * 7/1920 Slauson .................. E06B 11/04 49/190
1,349,797 A * 8/1920 Williams ................ E06B 11/04 16/253
1,467,029 A * 9/1923 Durham .................. E06B 11/04 16/253
1,469,425 A * 10/1923 Mehanna ............. A01K 1/0017 16/253
1,793,013 A 2/1931 Robertson
(Continued)

FOREIGN PATENT DOCUMENTS

AU 8430296 A * 1/1986 ............... E05D 5/02
FR 3073241 A1 * 5/2019
GB 2188091 A * 9/1987 ............... E05D 3/02

*Primary Examiner* — Emily M Morgan
(74) *Attorney, Agent, or Firm* — CARRITHERS LAW OFFICE, PLLC

(57) ABSTRACT

A gate hinge pin and strap assembly for attachment to a wooden post for supporting a gate including a J-bolt or threaded L-bolt with a metal strap affixed to the bolt between the threads and cylindrical neck portion. A bendable metal strap extends on each side of the J-bolt or threaded L-bolt. The L-shaped rod is threaded into the post until the metal strap contacts the post. Then each bolt of the metal bracket is bent around the post and screws or lag bolts are threaded through the holes and into the post to help secure the hinge to the post and to provide added support for the gate.

8 Claims, 9 Drawing Sheets

(56) References Cited

U.S. PATENT DOCUMENTS

| | | | | | |
|---|---|---|---|---|---|
| 2,563,960 | A * | 8/1951 | Reymann | E06B 11/02 | 16/248 |
| 2,837,760 | A * | 6/1958 | Ware | E05D 5/02 | 16/274 |
| 2,970,799 | A * | 2/1961 | Pinson | E06B 11/04 | 16/253 |
| 3,107,390 | A * | 10/1963 | Shelton | E05D 5/02 | 248/219.3 |
| 3,295,158 | A | 1/1967 | Hotchkiss, Jr. et al. | | |
| 3,304,656 | A | 2/1967 | Dvorak | | |
| 4,079,481 | A | 3/1978 | Cacidedo | | |
| 5,035,084 | A | 7/1991 | Towns | | |
| 5,167,049 | A * | 12/1992 | Gibbs | E05D 5/0215 | 16/253 |
| 6,073,396 | A * | 6/2000 | Kietzmann | E06B 11/04 | 16/237 |
| 8,413,300 | B1 * | 4/2013 | Luneborg | E05D 5/128 | 16/253 |
| 8,800,110 | B1 * | 8/2014 | Stephenson | E05D 7/0423 | 16/245 |
| 11,359,426 | B2 * | 6/2022 | Davis | E05D 5/02 | |
| 2006/0016046 | A1 * | 1/2006 | Koert | E05D 7/043 | 16/86.1 |
| 2008/0222842 | A1 * | 9/2008 | Faber | E05D 5/06 | 16/86.1 |
| 2022/0381074 | A1 * | 12/2022 | Davis | E05D 5/04 | |

* cited by examiner

GATE HINGE PIN ASSEMBLY

CROSS REFERENCES TO RELATED APPLICATIONS

This application is a continuation-in-part of U.S. Pat. No. 11,359,426 issued on Jun. 14, 2022 from U.S. application Ser. No. 16/428,720 filed on May 31, 2019 and is incorporated by reference herein in its entirety.

TECHNICAL FIELD

The present invention relates to the field of gate hinges, especially those made for use on wooden posts.

BACKGROUND OF THE INVENTION

Gate hinges have been in use for hundreds of years. Gates historically have been made of wooden slats nailed or bolted together and therefore tend to be quite heavy. A wooden gate that is sixteen feet long and which is four and one half feet tall can weigh more than one hundred pounds. Such a gate causes a great deal of strain on a post and on the hinges which must support the weight of the post plus the stresses put on the gate when swinging open and closed.

Typical farm gate hinges and some garden or yard gate hinges include two parts, a sleeve member which is fastened with the sleeve near one vertical edge of the gate, and a threaded hinge pin wherein one bolt is threaded into a wooden post and wherein the other bolt extends either upward or downward and wherein the sleeve of the sleeve member is slipped down over the upward or downward extending bolt of the threaded hinge pin. Such gates are generally fitted with two of these two part hinge, but in the case of a very heavy gate, three or more hinges may be required.

The most stressful position for that portion of gate hinge which is directly connected to the post is that in which the gate is wide open. As time goes on, the hinges will either get bent under the severe load or the holes in the post in which the support members are mounted or the threaded hinge pins will become loose in the holes. In either event, the gate will sag and may even fall to the ground.

DESCRIPTION OF THE RELATED ART

U.S. Pat. No. 8,800,110 for GATE HINGE by Stephenson which issued on Aug. 12, 2014 teaches a hinge including an L-bolt which is threaded and held within a plate by a nut on either side of the plate and wherein the plate has holes through which lag bolts are driven into the wooden post.

U.S. Pat. No. 1,188,302 for GATE HINGE by Mohns which issued on May 20, 1916 teaches an L-bolt cast with a plate with screw holes and a threaded rod which pierces and is threaded into the wooden post, after which a bracket is attached to either side of the plate by hooks and is then bolted around the fence post.

U.S. Pat. No. 8,800,110 by Stephenson reference recognizes the problem of having the hinge pins rotate within a post over time; however, the reference specifically addresses how the support plate should be mounted to the post by preparing the post by shaving in order that the rigid plate fit flat and flush against the post. The process of preparing the post takes extra time and increases the cost of mounting the gate in addition to weakening the post due to decreasing mass of the post. Moreover, on an old or used post, it may be difficult to find a solid surface to trim to support the plate.

Applicant's invention includes formable "bendable" support straps which can wrap around the post and are mounted to the post at a location other than the portion of the post facing the gate enabling the strap to cover a knot or decayed portion of the post if necessary to affix the strap to a solid foundation. Applicant asserts that the Stephenson reference actually teaches away from Applicant's claimed formable support straps because Stephenson teaches a non yielding flat support plate fitting into a cutout of a post.

The threaded portion of the hinge pin is rotatably inserted into a horizontal hole drilled in the post. A gate usually swings on a pair of spaced apart aligned hinge pins comprising a threaded shank having a distal point and a neck extending to an upturned post comprising a smooth rod or pin post bent at a 90 degree angle with respect to the shaft wherein a horizontal sleeve or a gate strap is mounted onto a gate and the sleeve mounts onto the pin post and rests on a circumferential lip or shoulder formed above the 90 degree elbow.

Because the weight of the gate pulls on the top hinge and pin, it tends to pull from the post and over time become loose so that the hinge pin rotates and the sleeve supporting the gate slips off of the top pin.

SUMMARY OF THE INVENTION

The present invention utilizes a bendable support strap which is immovably affixed or welded onto the post pin between the shank threads and the neck extending therefrom or a threaded shank from a pin can be immovably held in position by welding a threaded support strap nut to the strap and threadably affixing the threaded pin to the welded nut so that the distal end of the pin pass through a bore hole in the post and held to the post by a threaded nut on the opposing side of the post enabling tightening of the support strap nut against the post. The formable "bendable" support strap comprises a generally flat bendable support strap of material such as metal "steel, copper, or aluminum" or a "plastic, fiberglass, or graphite fiber material having memory" welded or immovably attaching to the pin shaft at a point where the threads of the shank stop and abut a cylindrical neck. The strap must be flat in order to screw the hinge pin into the hole in the post until the straps abut the post, whereby the straps are bent around the post and nailed or screwed into the post on either side of the hinge pin providing lateral support to the pin and preventing rotation or twisting of same.

One preferred embodiment of the gate hinge pin assembly of the present invention comprises or consists of a hinge pin including a shank having a distal tip having a point, a wedge shaped tip, or a screw tip for penetrating into a wooden gate post, a cylindrical neck extending from a proximate end of the shank, a stud projecting from the cylindrical neck at a 90 degree angle forming an elbow, and a collar disposed at a base of the stud. A bendable metal support strap includes a plurality of through holes formed therein, the bendable metal support strap is welded to the cylindrical neck of the hinge pin adjacent the shank, the bendable metal support strap extends perpendicular to the cylindrical neck, the bendable metal support strap including distal end portions that are bendable around the wooden gate post conforming to a shape of the gate post, and the bendable metal support strap attaching to the gate post with means for holding preventing rotation of the bendable metal support strap and the hinge pin with respect to the gate post. The means for holding is selected from the group consisting of nails, screws, bolts, and combinations thereof.

More particularly, the gate and hinge pin assembly comprises or consists of a hinge pin comprising a shank having a distal threaded portion connected to a smooth cylindrical neck portion. The distal end of the cylindrical neck is bent at a 90 degree angle and includes a shoulder having a stud extending therefrom. A gate having a pair of spaced apart vertical longitudinal end members has at least an upper and lower horizontal member extending there between and includes a pair of spaced apart aligned horizontal sleeves extending outward from a selected vertical longitudinal end member. A formable support strap fixedly attaches to the hinge pin shank between the cylindrical neck and the distal threaded portion. The formable support strap comprising a generally flat bendable horizontal band of material having a hole therein for cooperatively engaging the shank disposed therein between the distal threaded portion and the smooth proximate portion of the shank.

In accordance with the present invention, there is provided a two part gate hinge comprising, consisting of, or consisting essentially of a gate strap including a distal end sleeve member and an threaded hinge pin comprising a J-bolt or threaded L-bolt. The threaded L-bolt includes a long threaded bolt about eight to twelve inches long, a 90 degree elbow, a short smooth cylindrical neck about two and one half inches long, and a long rectangular metal strap affixed perpendicular thereto about twelve to sixteen inches long, about one and one half to two inches wide and about one eighth to three sixteenths inch thick. The metal strap has a hole formed therein in a center sized to receive the shank of the J-bolt or threaded L-bolt which passes through the first hole and is permanently fixed to the metal strap near the elbow about one and one half inches from the elbow at right angles with the metal strap. The threaded bolt has threads formed thereon from the pointed free end to the junction of the threaded bolt with the metal strap. The shorter bolt of the threaded hinge pin includes a flat metal washer permanently fixed near the elbow and about two inches from a free end of the shorter bolt with a top surface of the washer perpendicular to the shorter bolt. The metal strap has at least four holes formed therein, each of the four holes being within about one half inch of each corner. The metal strap is capable of being bent and formed around a partial circumferential surface of a fence post. The sleeve member comprises a long flat metallic rectangular member about eighteen inches long and about two inches wide, with one end turned back on itself, forming a sleeve capable of rotatably receiving the stud of the threaded hinge pin. The sleeve member has a plurality of holes formed therein for insertion of screws or bolts for fastening the sleeve member to a vertical edge of a gate.

It is an object of this invention to provide a two part gate hinge pin assembly attached to a wooden gate post with an upward extending bolt on which to slip the sleeve member of the gate strap, and wherein the hinge pin includes a strap of metal which extend to the left and right of the threaded bolt and which includes holes for inserting and threading of screws or lag bolts into the post to brace the hinge pin from movement to the left or right.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
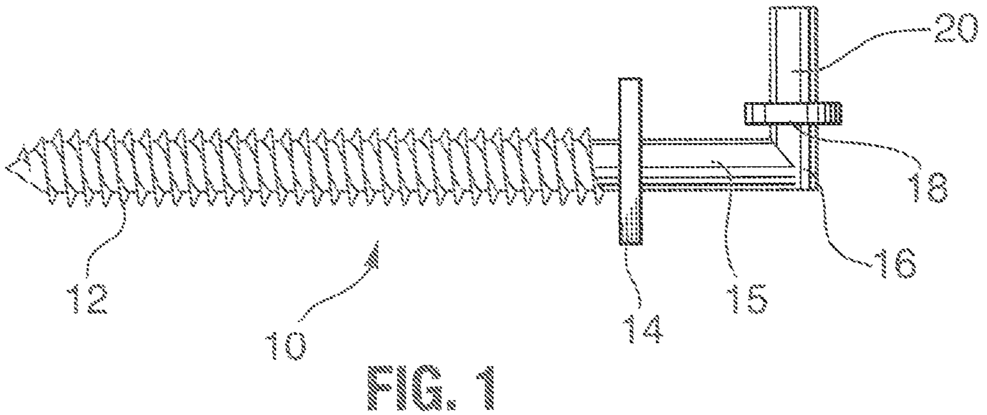
FIG. 1 is a side view of the hinge pin assembly showing the threaded J-bolt and horizontal support strap.
Figure 2:
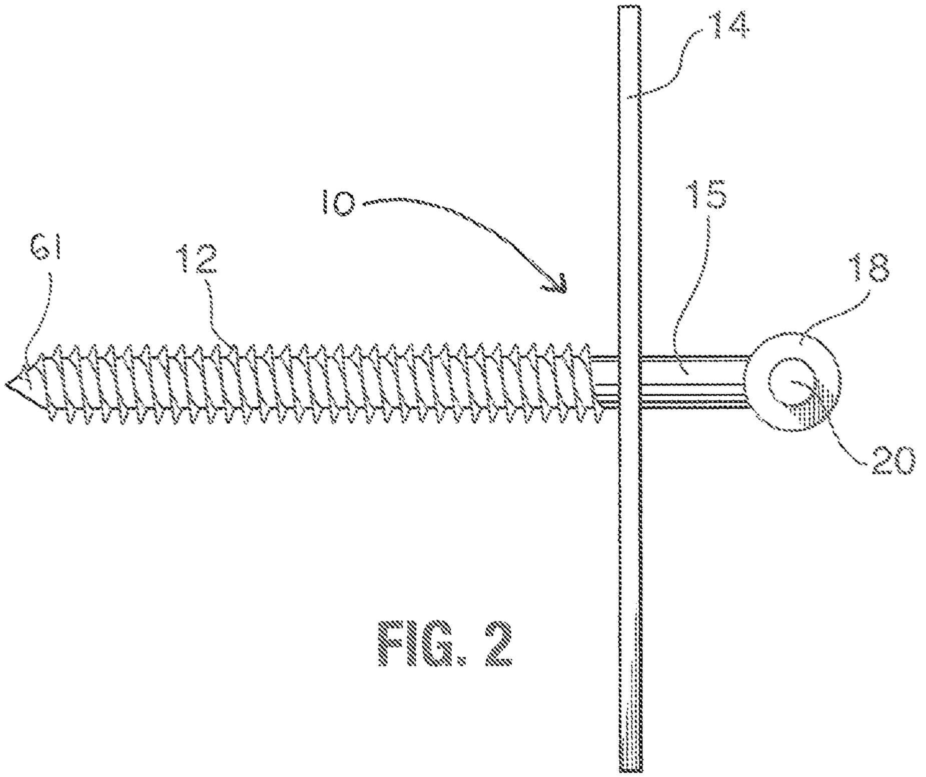
FIG. 2 is a top view of the hinge pin assembly of FIG. 1.
Figure 3:
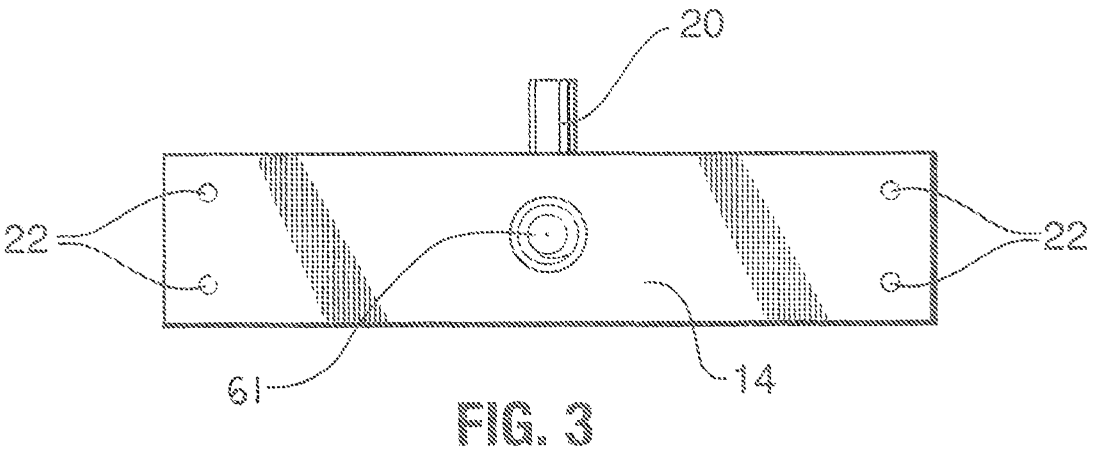
FIG. 3 is an end view of the hinge pin assembly showing the tip of the threaded J-bolt and support strap with holes for insertion of screws or lag bolts and the upturned stud.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in the figures, a gate hinge pin is shown supporting a gate with a gate hinge and pin assembly for supporting a gate having a gate strap with an upturned loop or sleeve 30. Each gate strap is a long flat metallic rectangular member 34 with one end turned back on itself, forming a loop 32. The loop strap member 30 includes a plurality of spaced apart attachment holes 36 drilled or formed therein for insertion of screws 17 or bolts for fastening the loop strap member to the vertical edge of a gate frame or support member as shown in FIG. 6 for cooperative engagement with a hinge pin extending from a post.

As shown in FIGS. 1-3 and 10-12, 18, and 20-21, the gate hinge pin assembly 10 of the present invention includes a bendable pin strap 14 supporting a J-bolt hinge pin 10. The support strap 14 includes a plurality of spaced apart attachment holes 22 drilled or formed therein for insertion of screws 17 or bolts for bending and fastening the a pin strap 14 around a gate support post after a threaded pin 10 has been inserted through a horizontal bore hole formed in the post in order that the gate hinge pin assembly can support the sleeve 32 of a sleeve strap member 30 of a gate.

Figure 4:
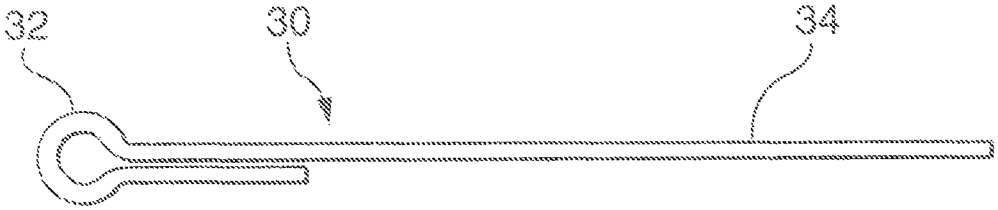
FIG. 4 is a top view of a gate strap having a distal end sleeve.
Figure 5:
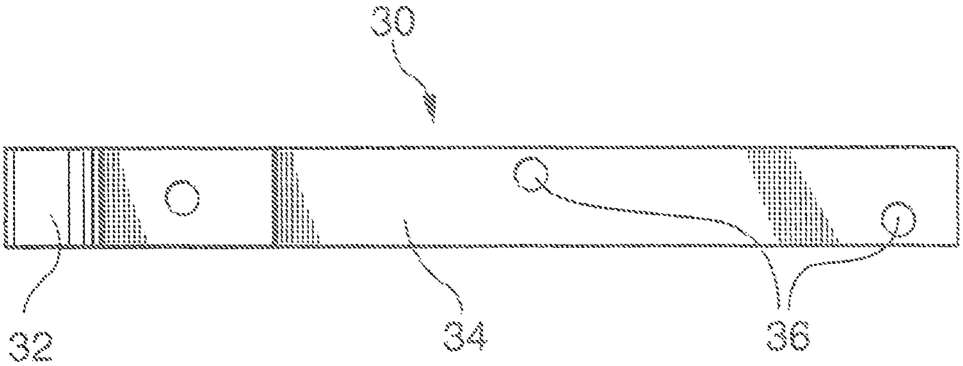
FIG. 5 is a side view of the gate strap of FIG. 4 showing the holes for attaching the gate strap to a horizontal support member of a gate with bolts.
Figure 6:
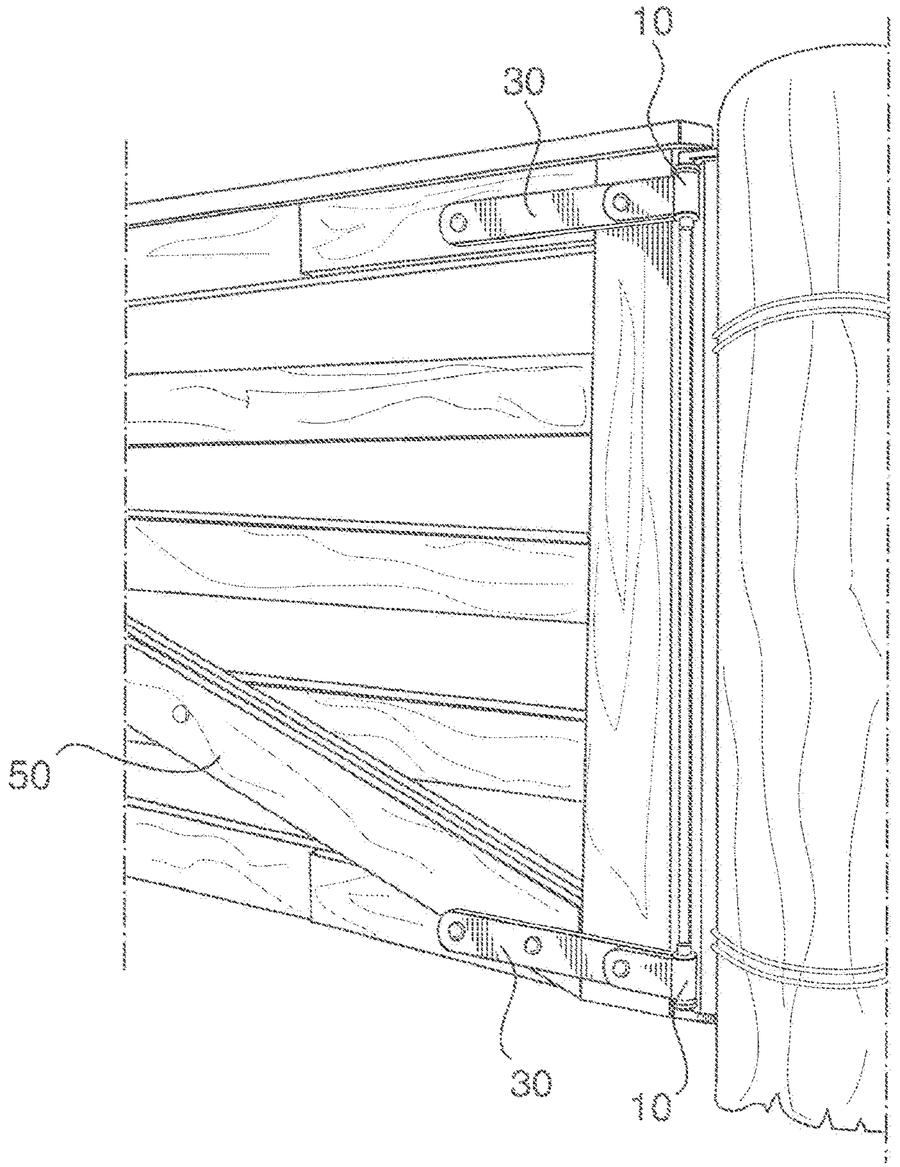
FIG. 6 is a front view of a gate held to a wooden post by gate straps cooperatively engaging upper and lower J-bolts affixed to a wooden post.
Figure 7:
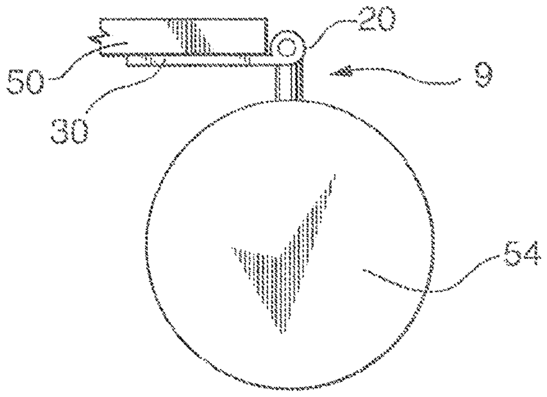
FIG. 7 is a top view of a wooden post showing a gate strap supported by the stud of a J-bolt.
Figure 8:
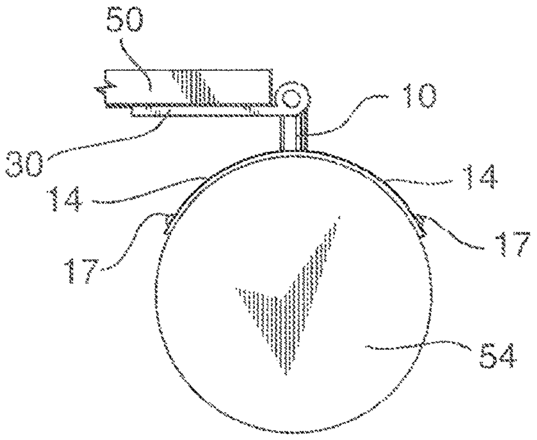
FIG. 8 is a top view of a wooden post showing a gate strap supported by the stud of a J-bolt including the support strap bent to the curvature of the post and affixed to the wooden post by screws to prevent rotation of the support strap and J-bolt.
Figure 9:
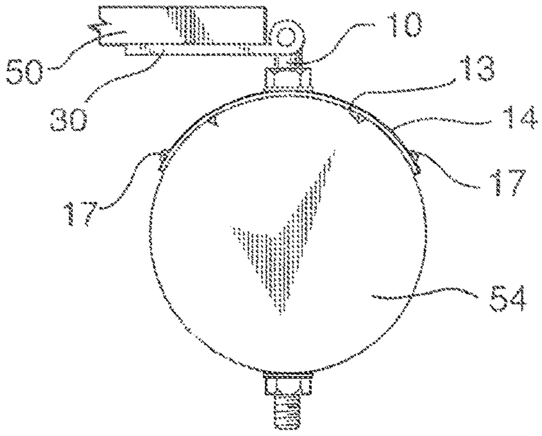
FIG. 9 is a top view of a wooden post showing a gate strap supported by the stud of a L-bolt having hinge support straps curved around a wooden post showing a threaded nut affixed to the outer surface of the support strap by welding with the nut cooperatively engaging the threaded shaft of the L-bolt extending through the post with a washer and threaded nut cooperatively engaging the threaded shaft of the distal end of the L-bolt for tightening against the post.
Figure 10:
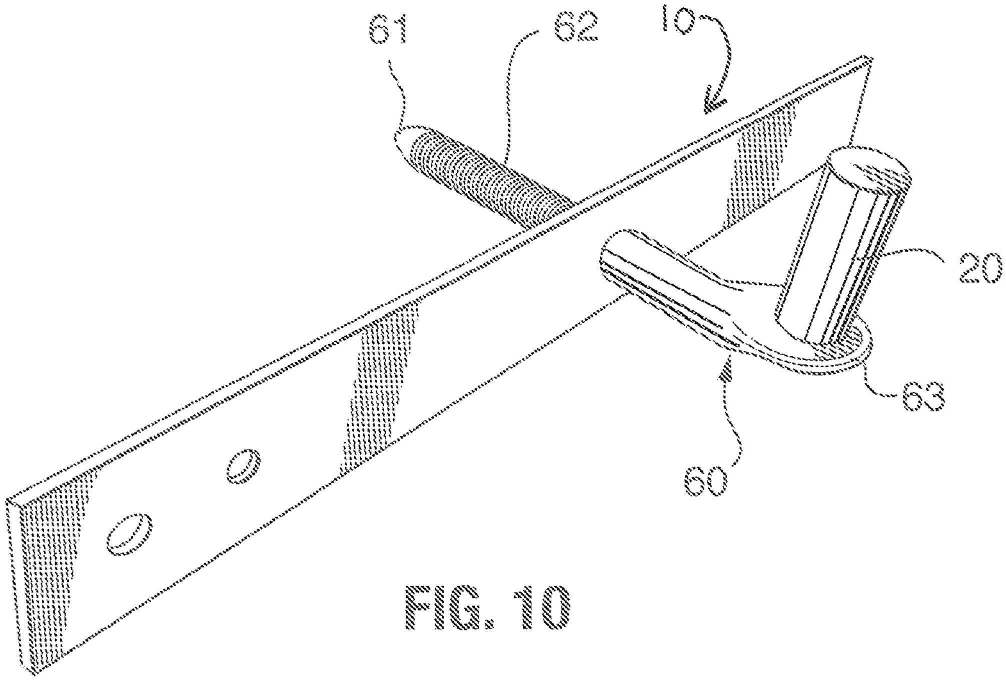
FIG. 10 is a perspective view of the hinge pin assembly showing the J-bolt and stud with the support strap.
Figure 11:
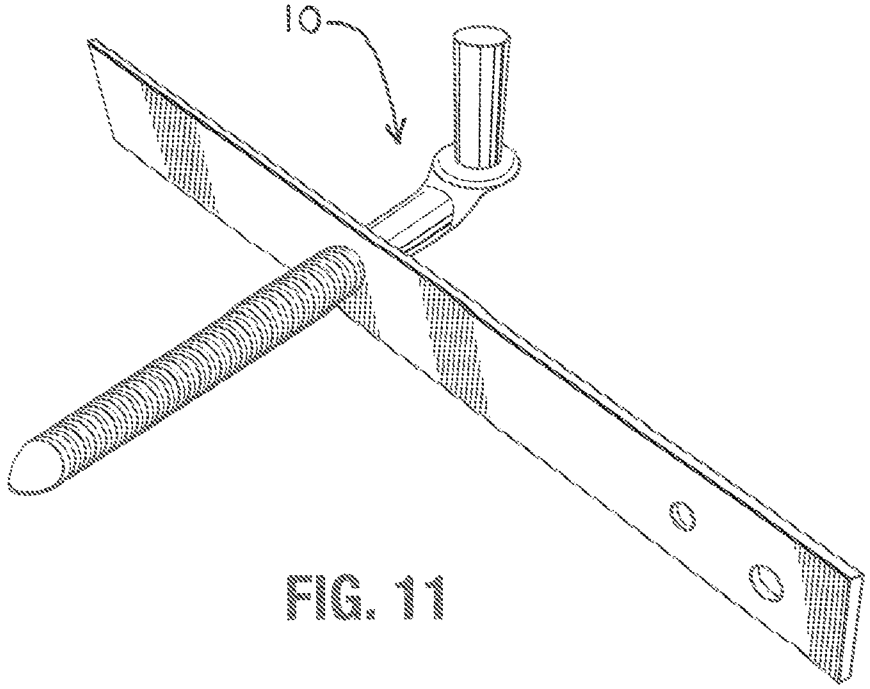
FIG. 11 is a perspective view of the hinge pin assembly of FIG. 10 showing with the J-bolt shaft with support strap.

As shown in the FIGS. 4-6, the hinge and pin assembly includes a pair of spaced apart aligned loop strap members 30 affixed to a gate, each one shown as a long flat metallic rectangular member 34 with one end turned back on itself, forming a loop 32 extending pass the edge of the gate for cooperative rotating engagement with the hinge pin 9. The loop strap member 30 includes a plurality of spaced apart attachment holes 36 drilled or formed therein for insertion of screws 17 or bolts for fastening the loop strap member to the vertical edge of a gate frame or support member for cooperative engagement with a hinge pin extending from a post.

The threaded L-bolt 11 comprises a threaded shank 67 protruding through a hole formed in a long rectangular metal strap 14 affixed on the threaded bolt 15 near the elbow 16 at right angles with the shaft 67 having a flat end 68. A short upturned stud 20 which is about two and one half inches long extends from the elbow 29. An enlarged collar 18 provides a support surface for rotational movement of a gate hinge thereon. The proximate end of the threaded section may be affixed to the strap 14 or to a stationary threaded nut 65 affixed to the strap 14 by welding or other means.

The J-bolt 10 includes a threaded shank, a long rectangular metal strap 14 affixed on the threaded bolt near the elbow 16 at right angles with the threaded bolt, elbow which is 90 degrees, and a shorter upturned stud 20 which is about two and one half inches long. The threaded J-bolt typically including a pointed tip 61 extending from a threaded longitudinal body 62 having a short upturned cylindrical shaft or stud 20 extending therefrom at a right angle usually with a enlarged collar 63 portion separating the stud and threaded longitudinal body, whereby the collar provides a support surface for rotational movement of a gate hinge thereon. The proximate end of the threaded section may be welded to the strap or to a stationary threaded nut 65 affixed to the strap by welding or other means.

The threaded J-bolt may be threaded from the pointed end 61 all the way to the elbow 16 but is preferably threaded only to about where the junction of the threaded bolt is with the metal strap 14. The stud 20 of the threaded hinge pin includes an optional flat metal collar 18 affixed near the elbow 16 and about two inches from the free end of the stud 20. The top surface of the washer 18 is perpendicular to the stud 20. Preferably, the proximate stationary nut may be permanently affixed to the outer surface of a strap preventing rotation of the nut and strap.

The threaded L-bolt 11 has a threaded shank with a short cylindrical neck and an upturned elbow defining a stud 20 extending therefrom at a right angle including at least one and preferably two threaded nuts with optional washers for tightening the threaded member after insertion into a bore hole of a post. The threaded L-bolt 11 shaft 67 extends from the strap 14 affixed to the shaft 67 through a bore hole in the post 54 and is tightened against the post 54 with a locknut 66. The metal strap 14 is then bent around the post 54 and fastened to the post 54 with nails 17 to prevent rotation of the L-bolt 11 within the post 54.

After insertion a selected depth through a bore hole in a post the threaded longitudinal member of the J-bolt 10 may be tightened to the post by rotating the stud or a second threaded nut 66 and optional washer in cooperative engagement with the distal end of the threaded shaft 12 whereby the stationary strap nut is held while the second nut is rotated tightening the hinge pin against the post.

The longitudinal strap 14 is composed of a bendable metal or plastic material having memory allowing the strap to be bent and curved around a post. It is necessary that the metal strap is form-able around the curved surface of a fence post. The pointed end 61 of the threaded bolt passes through a hole in the center of the long metal strap 14 which is then permanently attached to the threaded bolt about one and one half to two inches from the elbow 16. There is a selected number of smaller attachment holes 22 and preferably at least four attachment holes 22 in the strap 14. It is contemplated that spikes 13 may also protrude from the inner surface of the straps for cooperative engagement with the posts in order that the spikes may be driven into the posts to prevent rotation of the straps on the post.

In J-bolt 10 embodiments utilizing a pointed shank the hinge pin is typically welded onto the pin at a point where the threads of the shank stop. The support strap remains flat and extend at a 90 degree angle with respect to the hinge pin shaft in order to provide clearance with the post when screwing the hinge pin into the bore hole of the gate post until the support strap abuts the post. The support strap is then bent around the post and nailed or screwed into the post on either side of the hinge pin providing lateral support to the pin and preventing rotation or twisting of same.

Figure 12:
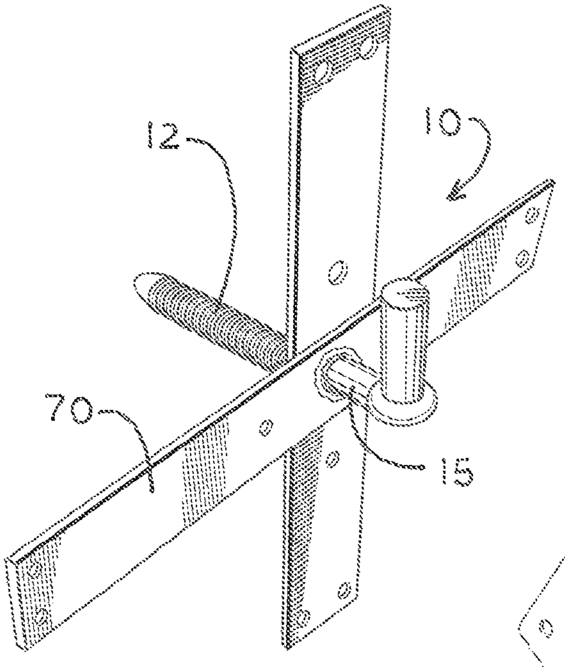
FIG. 12 is a perspective view of a hinge pin assembly showing the J-bolt and support strap wherein the support strap is comprised of two opposing diagonal straps forming an "X" support strap having a hole formed in the center thereof with the shaft of the hinge pin extending through a selected distance and the hinge pin is welded at the intersection of the neck to the threaded shaft to the edges of the hole formed in the center of the X support strap whereby the distal ends of the X support strap can be formed or bent around a post and nailed or screwed thereto after the threaded shank portion of the hinge pin has been screwed into the gate post.
Figure 13:
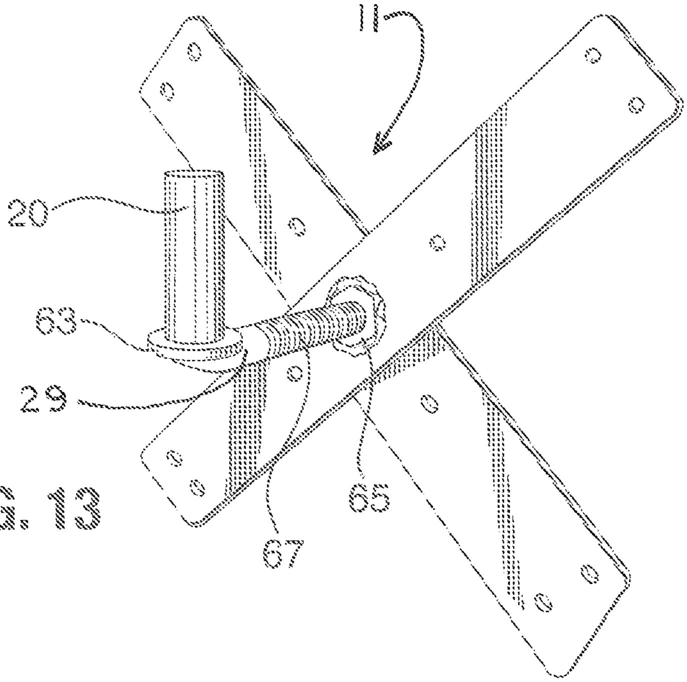
FIG. 13 is a perspective front view of a hinge pin assembly showing the threaded L-bolt and "x" support strap wherein the threaded shaft of the hinge pin or "L-bolt" cooperatively engages a threaded nut affixed to the center thereof in alignment with a center thorough hole.
Figure 14:
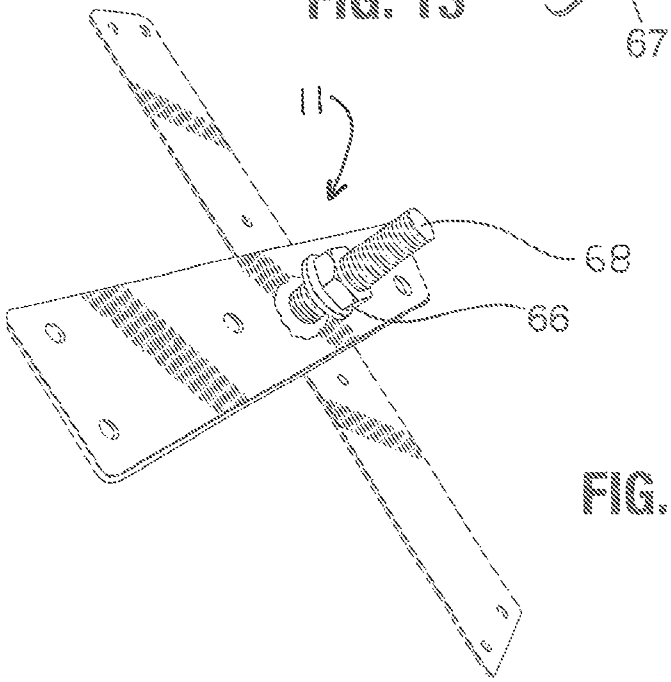
FIG. 14 is a perspective rear view of the embodiment of FIG. 13 showing the "x" support strap wherein the distal end of the threaded shaft of the hinge pin or "L-bolt" cooperatively engages a threaded nut for tightening the hinge pin against a post.
Figure 15:
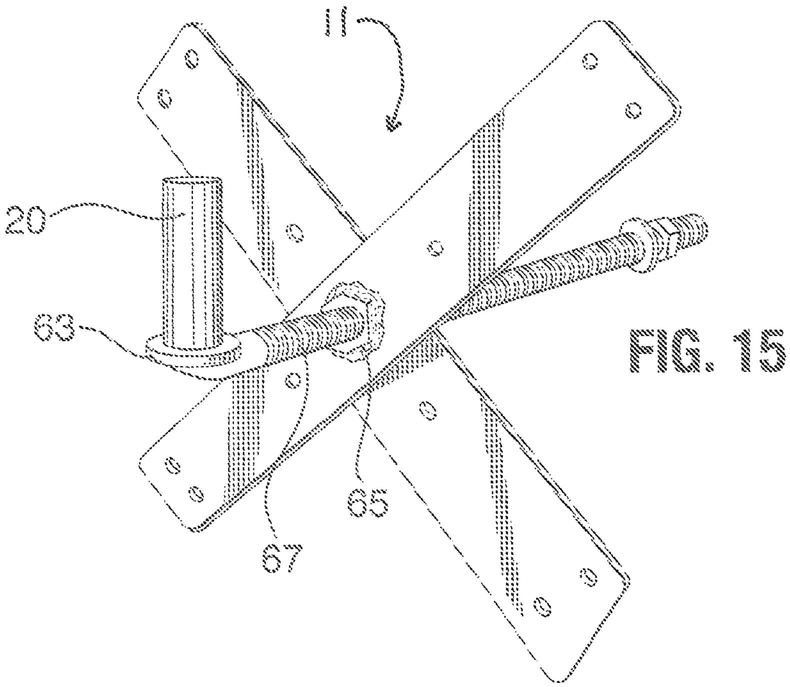
FIG. 15 is a perspective view showing the threaded L-bolt embodiments of FIGS. 13 and 14.
Figure 16:
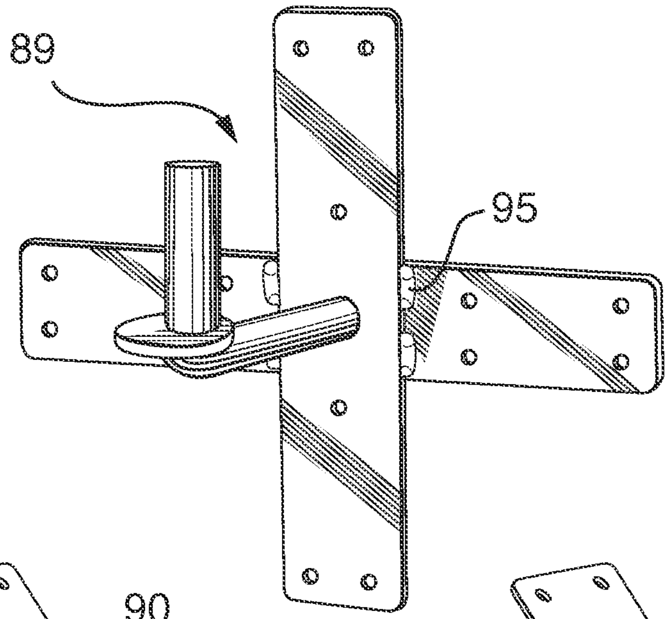
FIG. 16 is a perspective view of a J-bolt assembly showing the support straps welded together in a cross and showing the stud of the J-bolt.
Figure 17:
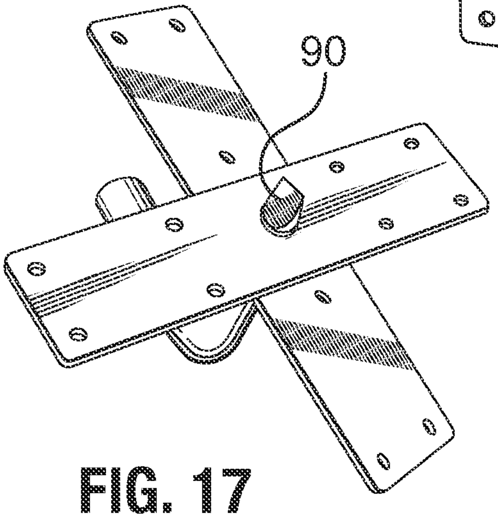
FIG. 17 is a perspective view of the J-bolt assembly of FIG. 16 including a wedged shaped tip.
Figure 18:
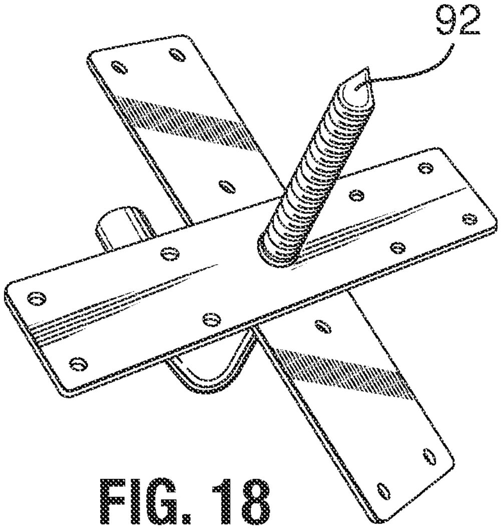
FIG. 18 is a perspective view of the J-bolt assembly of FIG. 16 including a threaded shaft and pointed screw tip.
Figure 19:
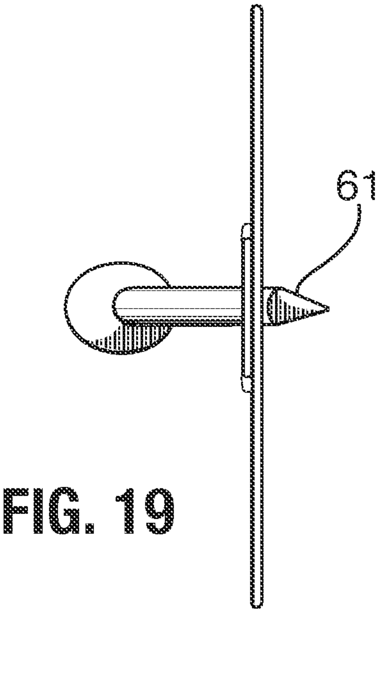
FIG. 19 is a perspective view of the J-bolt assembly of FIG. 16 showing a pointed tip.
Figure 20:
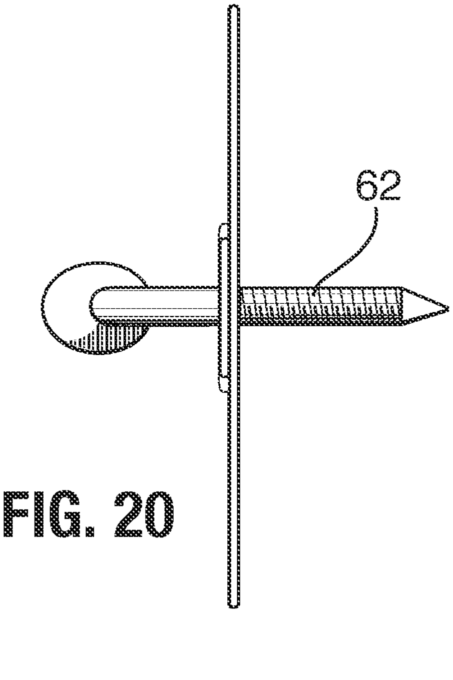
FIG. 20 is a perspective view of the J-bolt assembly of FIG. 16 showing a threaded shaft and pointed tip.
Figure 21:
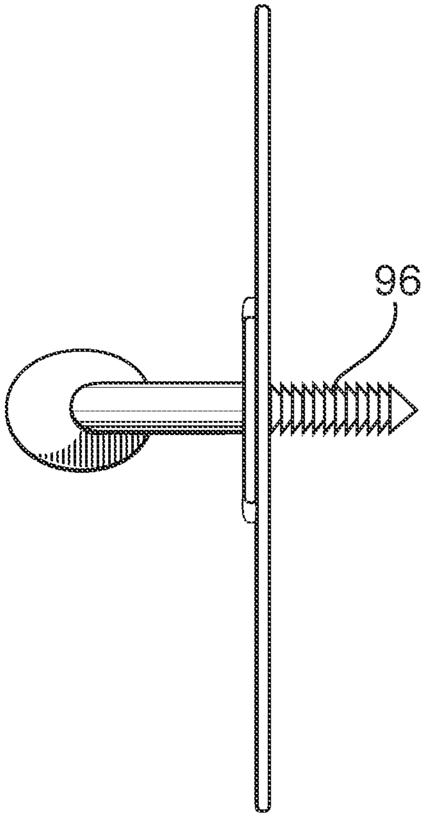
FIG. 21 is a perspective view of the J-bolt assembly of FIG. 16 showing a shaft having conical shaped sections and a pointed tip.

As shown in FIG. 12, a support strap comprising two opposing diagonal straps 14 forming an "X" support strap 70 with the shaft 12 of the hinge pin welded at the intersection of the neck 15 to the threaded shaft 12 in the center of the X support strap whereby the distal ends of the X support strap can be formed or bent around a post and nailed or screwed thereto after the threaded shank 12 portion of the hinge pin has been screwed into the gate post. FIG. 12 is a perspective view of a hinge pin assembly showing the J-bolt and support strap wherein the support strap is comprised of two opposing diagonal straps forming an "X" support strap having a hole formed in the center thereof with the shaft of the hinge pin extending through a selected distance and the hinge pin is welded at the intersection of the neck to the threaded shaft to the edges of the hole formed in the center of the X support strap whereby the distal ends of the X support strap can be formed or bent around a post and nailed or screwed thereto after the threaded shank portion of the hinge pin has been screwed into the gate post. The threaded shaft 67 of the "L-bolt" 11 shown in FIGS. 13-14 cooperatively engages a threaded nut affixed to the threaded shaft extending from the intersection of the neck 29 and threaded shaft 67.

The bendable support strap which is immovably affixed or welded onto the post pin between the shank threads and the neck extending therefrom, or a threaded shank from a pin can be immovably held in position by welding a threaded support strap nut to the strap and threadably affixing the threaded pin to the welded nut so that the distal end of the pin pass through a bore hole in the post and held to the post by a threaded nut on the opposing side of the post enabling tightening of the support strap nut against the post Immovably attaching the nut to the pin shaft is typically used with pointed tip pins whereby the pin is rotated within a bore hole in a wooded post and the threads of the pin compress the wood and are held in position by friction, wherein the straps are secured to the post to prevent further rotation of the pin. The pin is usually in the form of a threaded bolt whereby the pin or bolt is held in position by tightening a distal nut after the pin or bolt is inserted into the bore hole in the post and the strap and support strap nut abut the side of the post so that tightening the distal end nut pulls the support strap nut and straps snugly against the post and the straps can be positioned and secured to prevent further rotation of the pin to maintain orientation of the studs.

The J-bolt assembly embodiment 89 illustrated in FIGS. 16-21 show the support straps with welds 95 welding the support straps together in a cross and showing the stud of the J-bolt. As shown in figures the J-bolt 10 includes a wedged shaped tip 90, a pointed screw tip 92, a pointed tip 94, and a shaft having conical shaped sections 96.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

The invention claimed is:

1. A gate hinge pin assembly consisting of:

a hinge pin having a longitudinal body consisting of a shank having a distal point for projecting into a bore drilled into a wooden gate post, a cylindrical neck extending from a proximate end of said shank, said cylindrical neck having a distal end extending at a 90 degree angle with respect to said shank forming an elbow, said proximate portion of elbow having a collar and a stud extending therefrom perpendicular from said shank;

a bendable metal support strap consisting of a plurality of through holes formed therein, said bendable metal support strap is welded to said hinge pin at an intersection of said shank and said cylindrical neck, said bendable metal support strap extending perpendicular to said shank, said bendable metal support strap having distal end portions that are bendable around said wooden gate post conforming to a shape of said wooden gate post, and said bendable metal support strap attaching to said wooden gate post with means for holding preventing rotation of said bendable metal support strap and said hinge pin with respect to said wooden gate post.

2. The gate hinge pin assembly of claim 1, wherein said bendable metal support strap comprises at least two bendable metal support straps forming an x-shaped bendable metal support.

3. The gate hinge pin assembly of claim 1, wherein said means for holding is selected from the group consisting of nails, screws, bolts, and combinations thereof.

4. The gate hinge pin assembly of claim 1, wherein the distal point forms a point, a wedge, or a threaded point.

5. The gate hinge pin assembly of claim 1, wherein the shank includes threads.

6. A gate hinge pin assembly comprising:

a hinge pin having a shank having a distal point for cooperatively engaging a wooden gate post, a cylindrical neck extending from a proximate end of said shank, said cylindrical neck having a distal end extending at a 90 degree angle with respect to said shank forming an elbow, said proximate portion of elbow having a stud extending therefrom perpendicular from said threaded shank, said stud including a base defining a collar;

a bendable metal support strap consisting of a plurality of through holes formed therein, said bendable metal support strap is welded to said hinge pin at an intersection of said shank and said cylindrical neck, said bendable metal support strap extending perpendicular to said shank, said bendable metal support strap having distal end portions that are bendable around a wooden gate post conforming to a shape of said wooden gate post, and said bendable metal support strap attaching to said wooden gate post with means for holding preventing rotation of said bendable metal support strap and said hinge pin with respect to said wooden gate post; and said bendable metal support strap further having at least one spike protruding from an inner surface for cooperative engagement with said wooden gate post.

7. The gate hinge pin assembly of claim 6, wherein said means for holding is selected from the group consisting of nails, screws, bolts, and combinations thereof.

8. The gate hinge pin assembly of claim 6, wherein the distal point forms a point, a wedge, or a threaded point.

* * * * *